Feb. 24, 1970        L. G. WILDE        3,497,281

MODULAR ENCLOSURES

Filed Feb. 21, 1968        5 Sheets-Sheet 1

INVENTOR.
LEON G. WILDE
BY *Edward A. Gordon*
ATTORNEY

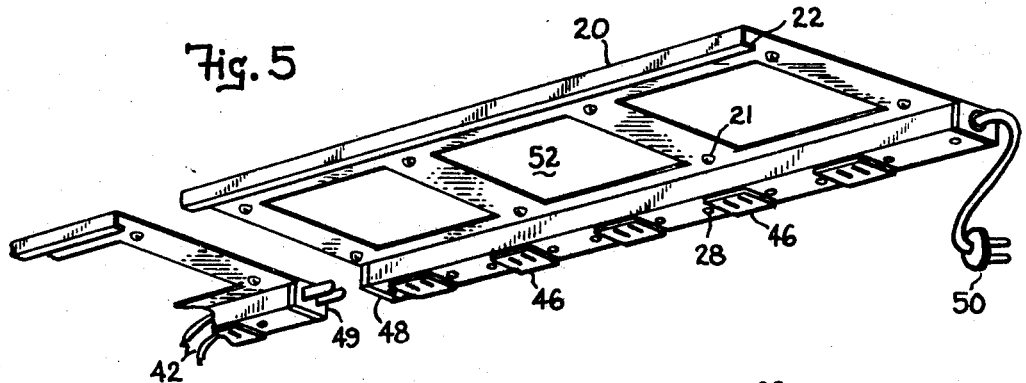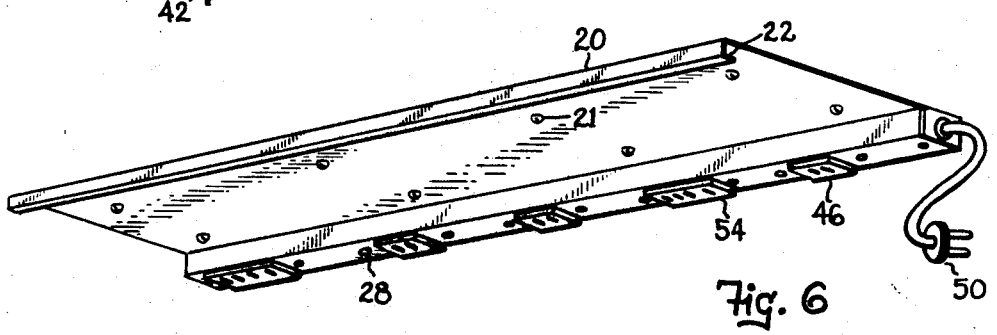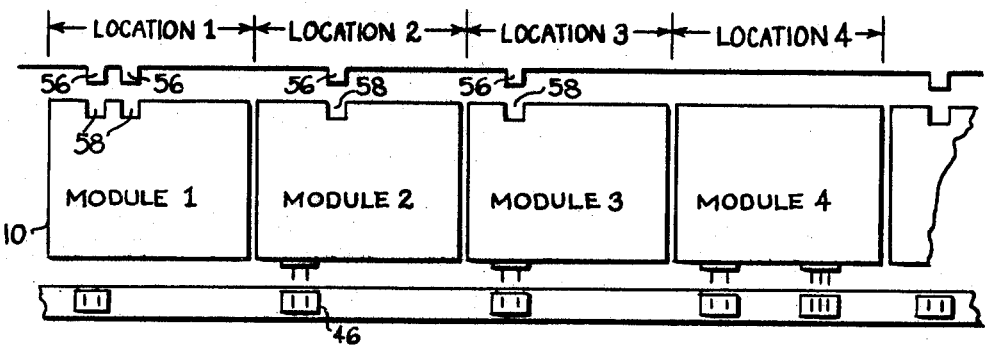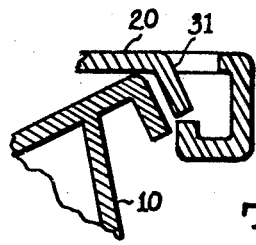

INVENTOR.
LEON G. WILDE

INVENTOR.
LEON G. WILDE
BY
ATTORNEY

United States Patent Office 3,497,281
Patented Feb. 24, 1970

3,497,281
MODULAR ENCLOSURES
Leon G. Wilde, 3 Chandler Circle,
Andover, Mass. 01810
Filed Feb. 21, 1968, Ser. No. 707,084
Int. Cl. A47b 77/08
U.S. Cl. 312—223                          11 Claims

ABSTRACT OF THE DISCLOSURE

A modular enclosure comprising a mounting member adapted to be supported from a supporting surface and at least one modular enclosure removably supported on said mounting member and having a substantially uniform cross-section along the width of the modular enclosures; the mounting member having at least one electrical connector adapted for engagement with an electrical connector carried by a modular enclosure.

---

This invention relates to enclosures and more particularly to modular enclosures for electrical, electronic, and mechanical appliances and equipment and for containing and dispensing various liquid, solid and gaseous materials.

Various types of enclosures have been heretofore designed for enclosing appliances and materials but many of these have drawbacks including dissimilar enclosures for each piece of equipment or material; elongated power cords required for electrical connection, and/or the enclosures generally rested on the working surface.

Small appliances, for example, are normally designed to rest upon a work surface, as in a kitchen, and connect to a source of electrical power by means of a power cord which is plugged into an electrical outlet. Such appliances are normally pushed to the rear of the work surface when not in use. Since the manufacturer of the appliance cannot forsee the distance to the nearest electrical outlet, he must provide a cord of practicable length for the appliance to be easily connected when in the operating position. This results in an excess of cord length in almost all cases, resulting in entangling problems, accretion of dirt and dust, and wear to the cord. This situation is a compromise to sanitation and safety. Also, the presence of many unused appliances on the work surface results in much of its area being used for storage and reduces the available work space. Appliances requiring connections to other electrical wiring or to water or other fluids normally require a permanent installation in a fixed location, making such installation inconvenient and costly to accomplish.

Additionally, in laboratories or manufacturing facilities, particularly in the electronics industry, the use of testing equipment is characterized by the use of numbers of equipments, each serving a specific purpose, but all of which are used in conjunction in some combination for accomplishing a given testing function. Such groups of equipment are often desired to be modified as the required testing function varies in the normal course of work. The many different types of equipment which are possible, as well as the high cost of such equipment, precludes the provision of a complete set of all possible equipment at each work station. Each station, therefore, is provided with only that equipment which is immediately needed, equipment being moved from one location to another at frequent intervals. Much time is spent properly connecting and interconnecting equipments, and the work space is often obstructed with a multiplicity of interconnecting wires and the like, resulting in unreliable and tangled connections, leading sometimes to costly errors.

Accordingly, a principal object of the present invention is to provide a modular enclosure which overcomes the disadvantages of the prior art enclosures.

Another object of the present invention is to provide a standardized modular enclosure and mounting means useful for storage of various materials or for enclosing various equipment.

Another object of the present invention is to provide standardized modular enclosures and mounting means whereby the modular enclosures may be quickly and easily mounting and removed.

A still further object of the present invention is to standardize modular enclosures and mounting means provided with safe and convenient means of introducing electrical or other inputs to the modular enclosure.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature ond objects of the invention reference should be had to the following detailed description taken in connection with the accompanying drawings wherein:

FIG. 5 is a perspective view of a preferred embodiment of the mounting member.

FIG. 6 is a perspective view of a modified embodiment of FIG. 5.

FIG. 7 is a side fragmentary cross-sectional view illustrating how engagement is prevented when the module is in the incorrect position.

FIG. 8 is a schematic illustration of the coding or keying of modules to the proper position along the mounting member.

Figure 1:
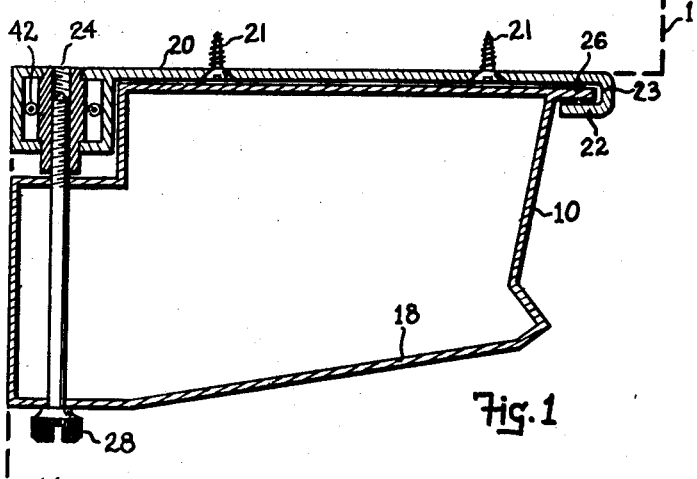
FIG. 1 is a side cross-sectional view of a modular enclosure and supporting member of the present invention.

The present invention is directed to a modular enclosure and mounting means suitable for storage purposes or for enclosing various equipment including equipment requiring electrical power. Such enclosures are used for domestic kitchen appliances, laboratory or office equipment, and similar applications.

Referring now to the various figures of the drawing wherein like reference characters refer to like elements there is shown a modular enclosure, generally designated by the reference numeral 10, in simplified form mounted beneath a cabinet 12, adjacent to a wall 14 and over a work surface 16. The cross-section of the modular enclosure as defined by the wall 18 of the modular enclosure is preferably substantially uniform to provide a uniform and attractive appearance.

In accordance with the present invention it is to be understood that the modular enclosures may be varied in size and shape the principal requirement being that a particular system or series of modular enclosures have substantially the same cross-section and that the length of the various modular enclosures for a given system be multiples of the smallest modular unit of the system.

The modular enclosure 10 is supported by a mounting member generally designated by the reference numeral 20 and is provided with spaced apart attaching means attaching means 22, 24 are preferably arranged to engage with corresponding attaching means 26, 28 of the modular enclosure 10 for removably supporting the modular enclosure. Preferably the front attaching means 22 consists of the edge of the mounting member which forms an inwardly opening groove 23 adapted to engage the flange 26 of the modular enclosure. The rear attaching means preferably consists of screw means 28 mounted on enclosure 10 so as to engage the threaded portion 24 of the mounting member 20. The mounting member may be attached to the supporting surface of cabinet 12 by suitable means such as screws 21.

Figures 3, 3A:
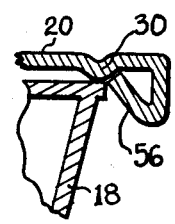
FIG. 3 is a side fragmentary cross-sectional view of a preferred embodiment for spring loading the modular enclosure to the mounting member.
FIG. 3A is a side fragmentary cross-sectional view of positioning means as applied to FIG. 3.
Figure 4:
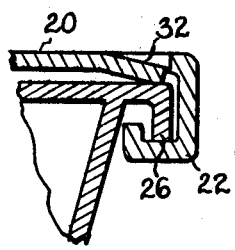
FIG. 4 is a side fragmentary cross-sectional view of an alternate embodiment of means for spring loading.

It is to be understood that the configuration of the edge 22 of the mounting member which forms the front attaching means may be varied within the scope of the present invention. Similarly the configuration of the flange 26 of the modular enclosure may be correspondingly varied for engagement with the edge as is illustrated in FIG. 3 and FIG. 4.

Additionally the mounting member may be provided with a raised portion such as the module 30 (FIG. 3) or a bent down section 32 (FIG. 4) which serves to spring load or releasably lock the flange 26 of the modular enclosure in place.

Figure 2:
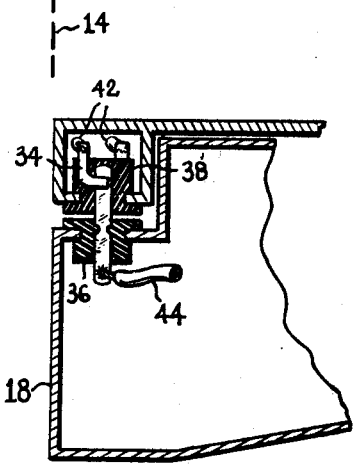
FIG. 2 is a side fragmentary cross-sectional view illustrating the introduction of electrical input to the modular enclosure.

With particular reference to FIG. 2 there is illustrated a preferred embodiment for the introduction of electrical input to the modular enclosure. In this embodiment the mounting member 20 carries electrical connectors 34 which receive electrical connectors 36 carried by the modular enclosure wall 18. A receptacle insulator 38 and plug insulator 40 are provided respectively for the mounting member electrical connector and the modular electrical connector. Electrical power is introduced through wires 42 and into the modular enclosure by wires 44.

Referring to FIG. 5 there is illustrated a preferred embodiment of the mounting bracket of the present invention. In this embodiment of the invention the mounting bracket 20 is provided with a multiplicity of electrical connecting means or outlets 46 and attachment means 21. Electrical power input is introduced to outlets 46 and electrical connector means 48 by plug means 50 which connects to a external source of electricity (not shown). The mounting member is constructed with openings 52 to reduce the cost of construction, to permit means associated with the modular enclosure to pass through and to provide access to the supporting surface as will be described hereinafter. As illustrated the mounting member may be constructed in suitable sections which may be electrically connected by electrical connecting means 48 and 49.

In FIG. 6 there is illustrated a modified embodiment of mounting member. In this embodiment the mounting member is not provided with openings 52. The mounting member of the present invention may be provided with multiple outlets 54, as illustrated in FIG. 6, in addition to the double outlets 46.

It is apparent then that when a modular enclosure is attached to the mounting member, electrical power is automatically made available without the use of power cords extending from the enclosure.

Figure 1A:
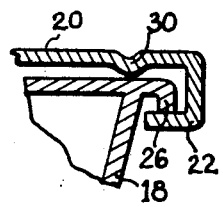
FIG. 1A is a side fragmentary cross-sectional view of a preferred means for positioning the modular enclosure along the mounting member.

In accordance with a preferred embodiment of the present invention means are provided to insure correct or selective positioning of the modular enclosure along the mounting member. In describing the positioning means, particular reference is made to FIGURES 1A, 3A, 4A, 7 and 8. As can be seen in FIGURES 1A, 3A and 8, a portion of the edge of attaching means 22 is bent up to form a key or tab 56 which prevents flange 26 from entering or engaging groove 23 unless the flange 26 is provided with a corresponding key way or slot 58.

Figure 4A:
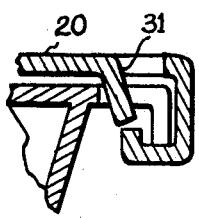
FIG. 4A is a side fragmentary cross-sectional view of an alternate embodiment of the means for positioning the modular enclosure along the mounting member.

As is illustrated in FIG. 4A the bent down portion 31 serves in the same manner as tab 56 to prevent the flange 26 from engaging unless the flange is provided with a corresponding cut out or space 58.

FIG. 7 illustrates how engagement is prevented when the module is in the incorrect positions. FIG. 8 illustrates in simplified form the coding or keying of modules to the proper position along the mounting member. Module 1, for example, will fit any location while module 2, will only fit in location 2 or location 4. Location 1 will accept only module 1 while location 4 will accept any module.

Thus in accordance with the present invention the modules may, for example, be coded or keyed according to electrical or other input requirements whereby it will fit on the mounting member only at a location providing the corresponding input requirements.

Figure 9:
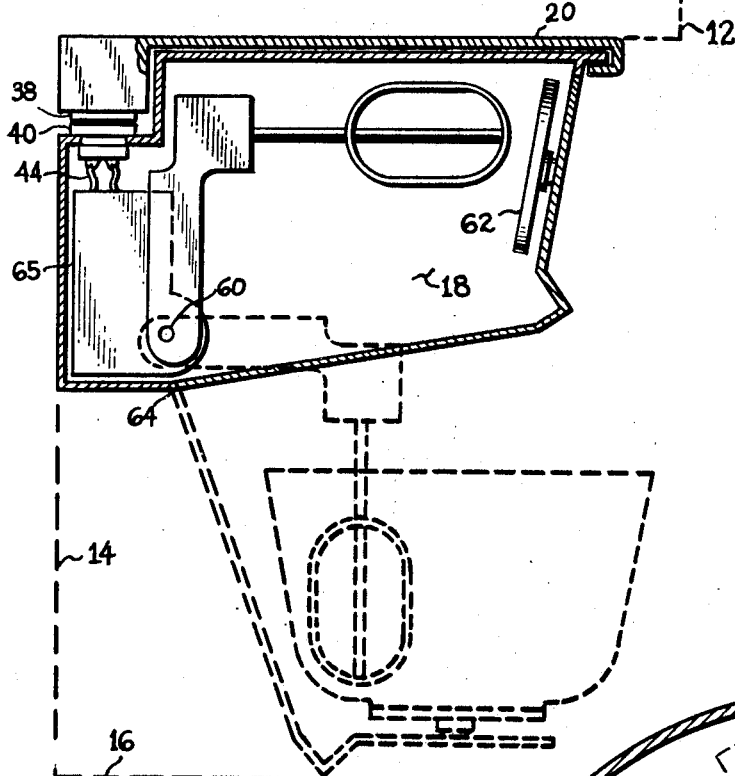
FIG. 9 is a side cross-sectional view illustrating a modular enclosure containing an appliance in accordance with the present invention.

Referring now to FIG. 9 there is illustrated a preferred embodiment of the invention useful for enclosing and storing a small appliance. In this embodiment of the invention a food mixer is shown in stored position; the operating position being shown by the dotted lines. As shown therein a suitable mixer 58 is pivotally attached to the wall 18 of the modular enclosure by suitable pivot means 60. Preferably a portion of the wall 18 carries a rotatable bowl support or turntable 62 and is itself pivotally attached to the remaining portion of wall 18 by pivot means 64. The mixer 65 is provided with suitable electric circuitry and controls (not shown) and is connected by electric wires 44 to the electrical input from the mounting member in the manner described with respect to FIG. 2. Thus the modular enclosure provides protection from dirt and dust in addition to a neat and compact appearance.

Figure 10:
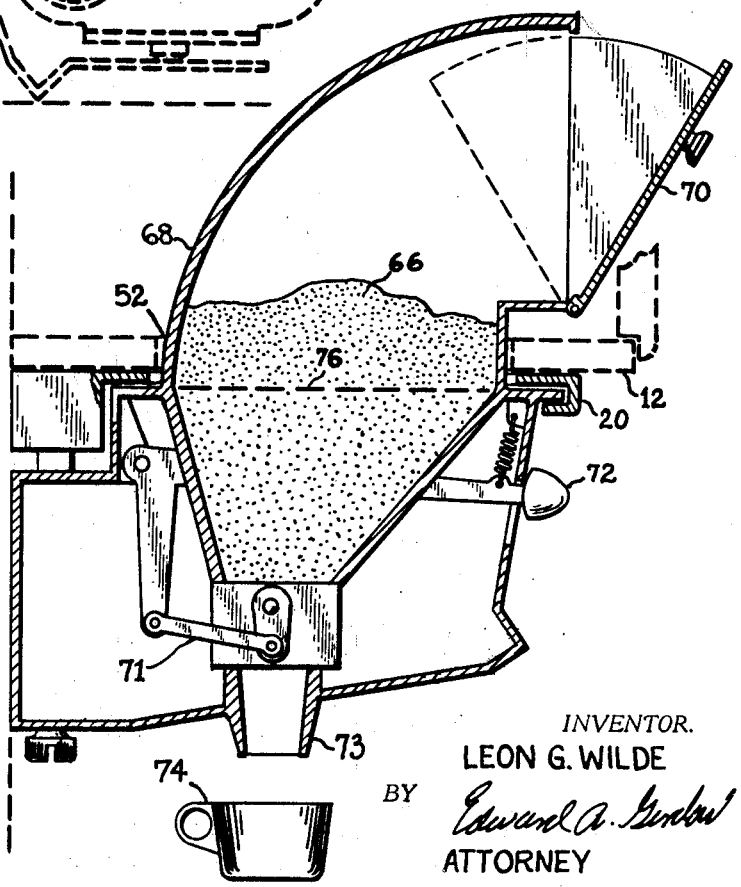
FIG. 10 is a side cross-sectional view of an embodiment of the present invention useful for storing and dispensing a solid material.

Referring now more particularly to FIG. 10 there is illustrated one preferred embodiment of the invention useful as a storage bin for dispensing a divided material such as a granular material 66. In this embodiment the bin 68 is constructed and arranged to extend up through an opening or space 52 as described with respect to the mounting member illustrated in FIG. 2. This embodiment of the invention is especially suitable when the module is supported below a cabinet 12 (represented by a dotted line) and whereby the bin can extend up through space 52 and thereby provide a bin of large capacity. Additionally, access to the door 70 of the bin may be had through the door of cabinet 12. The granular dispenser is also provided with a suitable control means 72 and associated operating linkage and dispensing valve, represented generally by referenced character 71, for dispensing a desired quantity of the granular material for example sugar through the opening 73 into a recepticle 74. It is to be understood that the volume of the bin may be constructed and arranged so as to be contained within the modular enclosure and in this manner would, for example, extend only as far as the dotted line 76.

Figure 11:
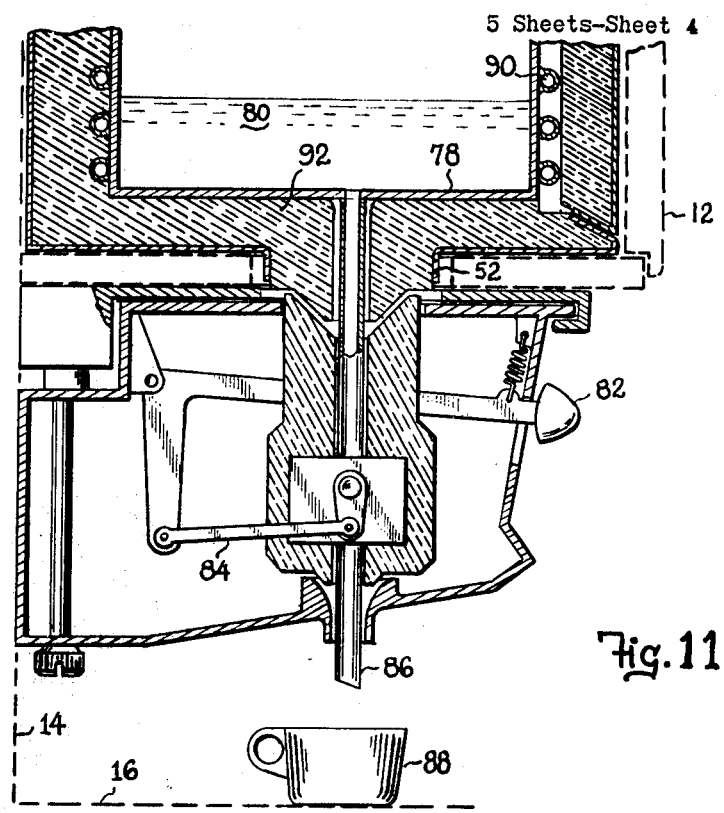
FIG. 11 is a side cross-sectional view of an embodiment of the present invention useful for storing and dispensing a liquid material.

Referring now to FIG. 11 there is illustrated one preferred embodiment of the present invention which is useful for storing and dispensing liquids. In this embodiment of the invention there is provided a container 78 for holding a liquid 80. The major part of the container 78 is preferably located in a cabinet 12 directly above the module and is preferably constructed and arranged to extend down through a space 52 and the mounting bracket into the module. The module is provided with a control lever 82 and associated operating linkage and dispensing valve, generally represented by the reference character 84, whereby a desired quantity of liquid for example, milk may be dispensed through opening 86, into a recepticle 88.

Where the liquid material is required to be refrigerated then coils 90 may be provided and connected to a suitable source of refrigerant (not shown). It is to be understood that other means of cooling such as thermoelectric means may be employed. When the liquid material is required to be heated above ambient temperature then electrical heating coils, for example, may be provided in place of the cooling coils 90 and connected to the electrical input as carried by the mounting member as described above in accordance with the present invention. In either case an insulation 92 is preferably provided to reduce heat transfer. The insulation may be rigid plastics foam, or cork, for example, or other insulation well known to those skilled in the art.

Figure 12:
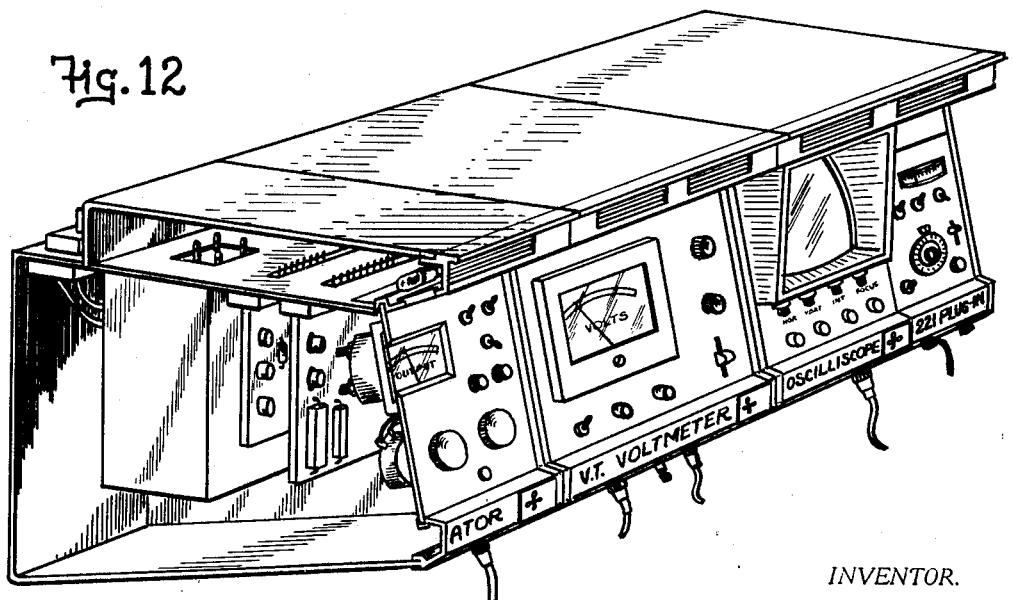
FIG. 12 is a perspective view of an embodiment of the present invention as applied to laboratory equipment.

Referring now to FIG. 12 there is shown a preferred embodiment of the present invention as applied to laboratory electrical and electronic equipment. In this embodiment the modular enclosures may be fabricated of stamped and extruded metal pieces to provide low cost and substantially uniform appearance.

Figure 13:
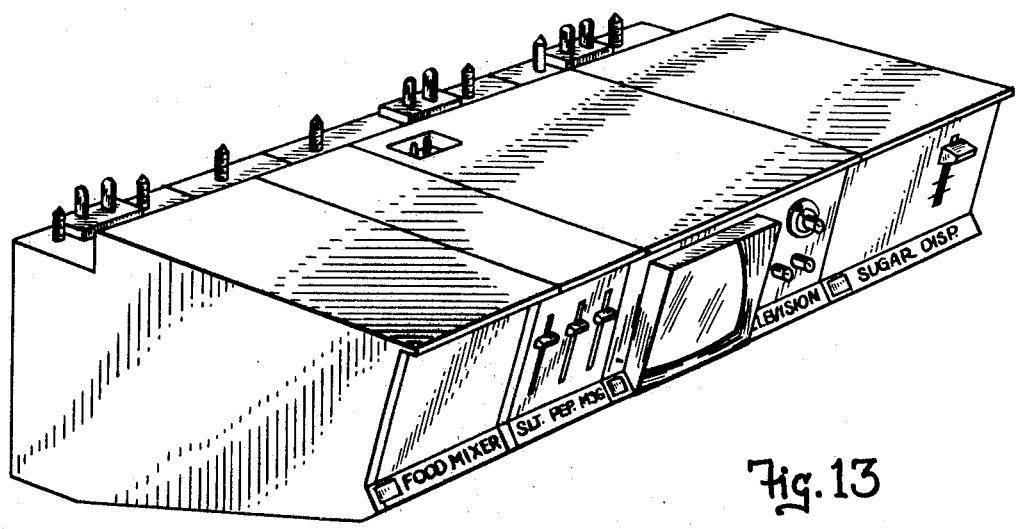
FIG. 13 is a perspective view of an embodiment of the present invention as applied to domestic uses.

With attention now directed to FIG. 13, there is illustrated a preferred embodiment of the present invention useful for domestic application.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:

1. A modular enclosure comprising a mounting member adapted to be supported from a supporting surface, at least one modular enclosure removably supported on said mounting member and having a substantially uniform cross-section along the width of said modular enclosure, said mounting member having spaced apart attachment means for engagement with said enclosure member, said mounting member having at least one electrical connection adjacent one of said attachment means adapted for engagement with an electrical connection carried by a modular enclosure.

2. A modular enclosure comprising a mounting member adapted to be supported from a supporting surface, at least one modular enclosure removably supported on said mounting member and having a substantially uniform cross-section along the width of said modular enclosure, said modular member having spaced apart attachment means for engagement with said enclosure member, means providing for selective positioning of modular enclosures along said mounting member, said mounting member having at least one electrical connection adjacent one of said attachment means adapted for engagement with an electrical connection carried by a modular enclosure.

3. The combination of claim 2 wherein said selective positioning means comprises a key carried by said modular enclosure and a keyway carried by said mounting member whereby the modular enclosure will be accepted at a point along said mounting member where said key and said keyway correspond.

4. The combination of claim 2 wherein said selective positioning means comprises a key carried by said mounting member and a keyway carried by said modular enclosure whereby the modular enclosure will be accepted at a point along said mounting member where said key and said keyway correspond.

5. The combination of claim 2 wherein said mounting member is provided with a raised portion whereby to spring load said modular enclosure to said mounting member.

6. The combination of claim 2 wherein said mounting member comprises an elongated member having openings between said attachment means whereby means associated with said modular enclosure may pass through.

7. The combination of claim 2 wherein said modular enclosure is adapted to store and dispense a liquid material.

8. The combination of claim 2 wherein said modular enclosure is adapted to store and dispense a solid material.

9. The combination of claim 2 wherein said modular enclosure is adapted to store and dispense a gaseous material.

10. The combination of claim 2 wherein said modular enclosure defines an electrical device and means for operating said device.

11. A modular enclosure comprising a mounting member adapted to be supported from a supporting surface, at least one modular enclosure removably supported on said mounting member and having a uniform cross-section along the width of said enclosure member, said mounting member being elongated and having spaced apart front and rear attachment means, said front attachment means having an inwardly opening groove, said modular enclosure including means for engaging said groove means and other means for securing said modular with said rear attachment means, said mounting member having at least one electrical connection adjacent said positioning means and adapted for engagement with an electrical connection carried by a modular enclosure.

References Cited

UNITED STATES PATENTS

| | | | |
|---|---|---|---|
| 2,551,305 | 5/1951 | Tompkins | 312—198 |
| 2,957,740 | 10/1960 | Lewis | 312—223 X |
| 3,162,497 | 12/1964 | Boswinkle et al. | 312—248 |
| 3,378,324 | 4/1968 | Earle | 312—278 |

CASMIR A. NUNBERG, Primary Examiner

U.S. Cl. X.R.

312—198, 245, 248